(12) United States Patent
Kraus et al.

(10) Patent No.: US 11,614,179 B2
(45) Date of Patent: Mar. 28, 2023

(54) ELECTROMAGNETIC FLEXURE VALVE AND ELECTROMAGNETIC FLEXURE VALVE COMPONENT

(71) Applicant: Haldex Brake Products AB, Landskrona (SE)

(72) Inventors: Alexander Kraus, Lindley Warwickshire (GB); Carl Mellings, Lindley Warwickshire (GB); Edward Shaw, Lindley Warwickshire (GB)

(73) Assignee: Haldex Brake Products AB, Landskrona (SE)

( * ) Notice: Subject to any disclaimer, the term of this patent is extended or adjusted under 35 U.S.C. 154(b) by 0 days.

(21) Appl. No.: 16/766,242

(22) PCT Filed: Sep. 27, 2018

(86) PCT No.: PCT/EP2018/076360
§ 371 (c)(1),
(2) Date: May 21, 2020

(87) PCT Pub. No.: WO2019/101401
PCT Pub. Date: May 31, 2019

(65) Prior Publication Data
US 2020/0370670 A1 Nov. 26, 2020

(30) Foreign Application Priority Data
Nov. 21, 2017 (GB) ...................................... 1719309

(51) Int. Cl.
*F16K 31/00* (2006.01)
*F16K 31/06* (2006.01)

(52) U.S. Cl.
CPC ........ *F16K 31/003* (2013.01); *F16K 31/0627* (2013.01)

(58) Field of Classification Search
CPC ........................... F16K 31/003; F16K 31/0627
See application file for complete search history.

(56) References Cited

U.S. PATENT DOCUMENTS 3,002,498 A 10/1961 Quayle
4,343,329 A 8/1982 Turansky et al.
(Continued)

FOREIGN PATENT DOCUMENTS

CN 1138894 A 12/1996
CN 101592251 A 12/2009
(Continued)

OTHER PUBLICATIONS

Complete Specification of United Kingdom Patent Application No. 852171, filed Aug. 1, 1958, 3 pages.
(Continued)

*Primary Examiner* — Eric Keasel
(74) *Attorney, Agent, or Firm* — Stoel Rives LLP (57) ABSTRACT

An electromagnetic flexure valve (1) including: a first pole piece (50*a*) and a second pole piece (50*b*); a flexure assembly (40) a portion of which is configured for movement between a first state adjacent the first pole piece and a second state adjacent the second pole piece; a coil (20) configured to receive electrical power from a power supply and to actuate the flexure assembly between the first and second states; and a biasing configuration configured to bias the flexure assembly into the first or the second state when the coil is not powered and irrespective of the current state of the flexure assembly such that a failsafe mode is provided.

20 Claims, 8 Drawing Sheets

(56) References Cited

U.S. PATENT DOCUMENTS

| | | | |
|---|---|---|---|
| 4,574,841 A | 3/1986 | Hügler | |
| 4,625,139 A | 11/1986 | Frisch | |
| 6,040,752 A | 3/2000 | Fisher | |
| 6,199,582 B1 | 3/2001 | Matsuzawa et al. | |
| 6,598,621 B1 | 6/2003 | Wygnanski | |
| 6,935,373 B2 * | 8/2005 | Wygnanski | F16K 31/0682 251/65 |
| 8,613,421 B2 * | 12/2013 | Arns | F16K 31/10 251/303 |
| 9,046,187 B2 | 6/2015 | Wygnanski | |
| 9,404,602 B2 | 8/2016 | Cebon et al. | |
| 10,458,440 B2 * | 10/2019 | Sarafin | F15B 13/0438 |
| 2003/0168112 A1 | 9/2003 | Wygnanski | |

FOREIGN PATENT DOCUMENTS

| | | |
|---|---|---|
| CN | 201487362 U | 5/2010 |
| CN | 101795910 A | 8/2010 |
| CN | 102918310 A | 2/2013 |
| CN | 104145149 A | 11/2014 |
| DE | 1084096 B | 6/1960 |
| DE | 102016107460 A1 | 10/2017 |
| EP | 1119723 A1 | 8/2001 |
| EP | 2405166 A2 | 1/2012 |
| EP | 2756215 A1 | 7/2014 |
| FR | 697174 A | 1/1931 |
| GB | 852171 A | 10/1960 |
| GB | 2044412 A | 10/1980 |
| GB | 2156047 A | 10/1985 |
| GB | 2395362 A | 5/2004 |
| WO | 2002004851 A1 | 1/2002 |
| WO | 2011138599 A1 | 11/2011 |
| WO | 2013038171 A1 | 3/2013 |
| WO | 2019101401 A1 | 5/2019 |
| WO | 2019101817 A1 | 5/2019 |

OTHER PUBLICATIONS

International Search Report for International Application No. PCT/EP2018/076360, dated Dec. 11, 2018, 16 pages.
International Search Report for International Application No. PCT/EP2018/082127, dated Feb. 15, 2019, 16 pages.
United Kingdom Patent Office, Search Report for Application No. GB1719309.5, dated May 11, 2018, 4 pages.
United Kingdom Patent Office, Search Report for Application No. GB1806527.6, dated Oct. 15, 2018, 3 pages.

* cited by examiner

ELECTROMAGNETIC FLEXURE VALVE AND ELECTROMAGNETIC FLEXURE VALVE COMPONENT

RELATED APPLICATIONS

This application is a National Stage of International Application No. PCT/EP2018/076360, filed Sep. 27, 2018, which claims priority of Great Britain Patent Application No. 1719309.5, filed Nov. 21, 2017, both of which are hereby incorporated by reference in their entireties.

DESCRIPTION OF INVENTION

Embodiments relate to an electromagnetic flexure valve and a flexure assembly.

Binary actuator valves suitable for use in fluid control systems are known. A good example of a significant development can be found in EP2756215. FIG. 3 of this document is replicated in the present application as FIG. 1 for ease of reference.

Figure 1:
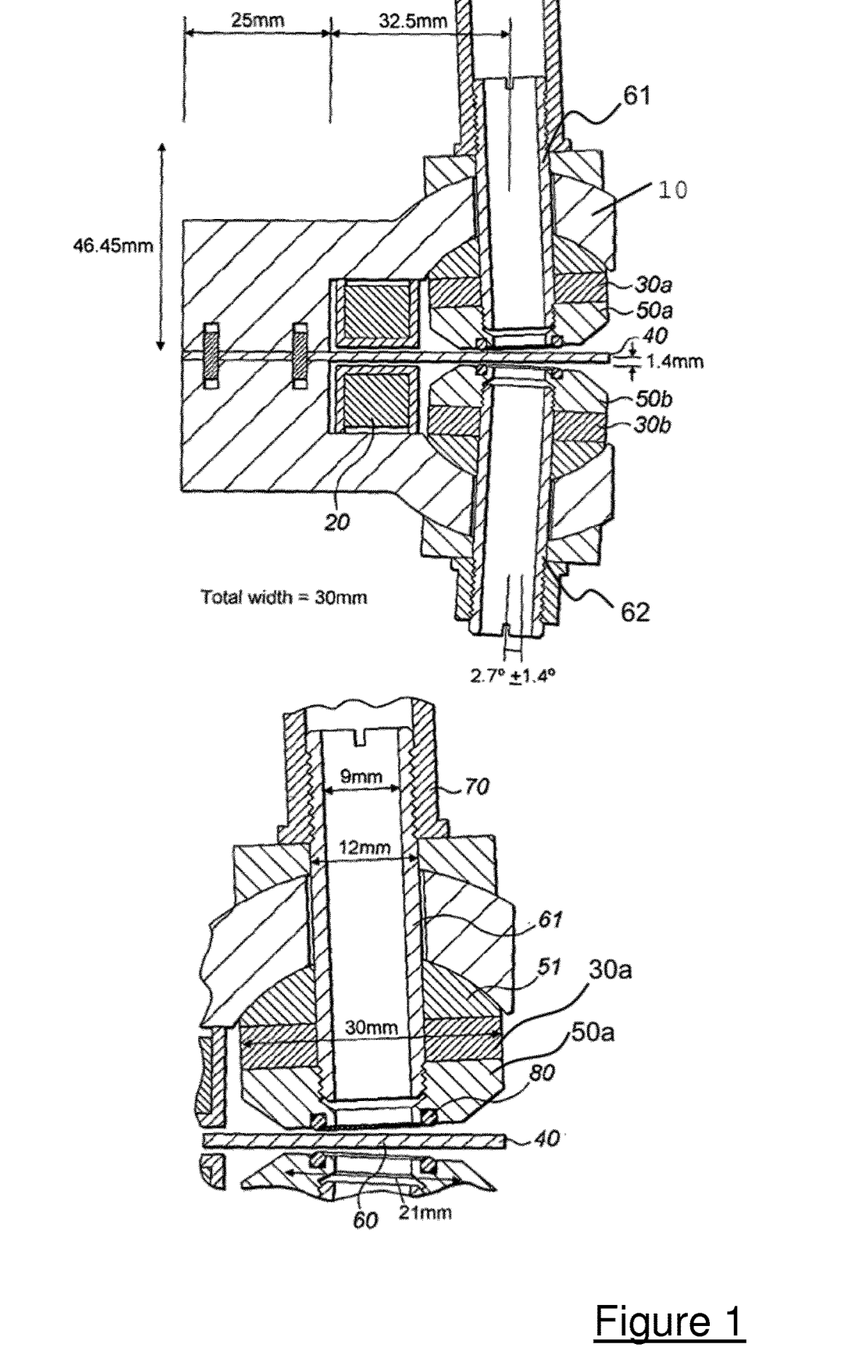
FIG. 1 shows a valve according to EP2756215 which may be used in accordance with some embodiments.
Figure 2:
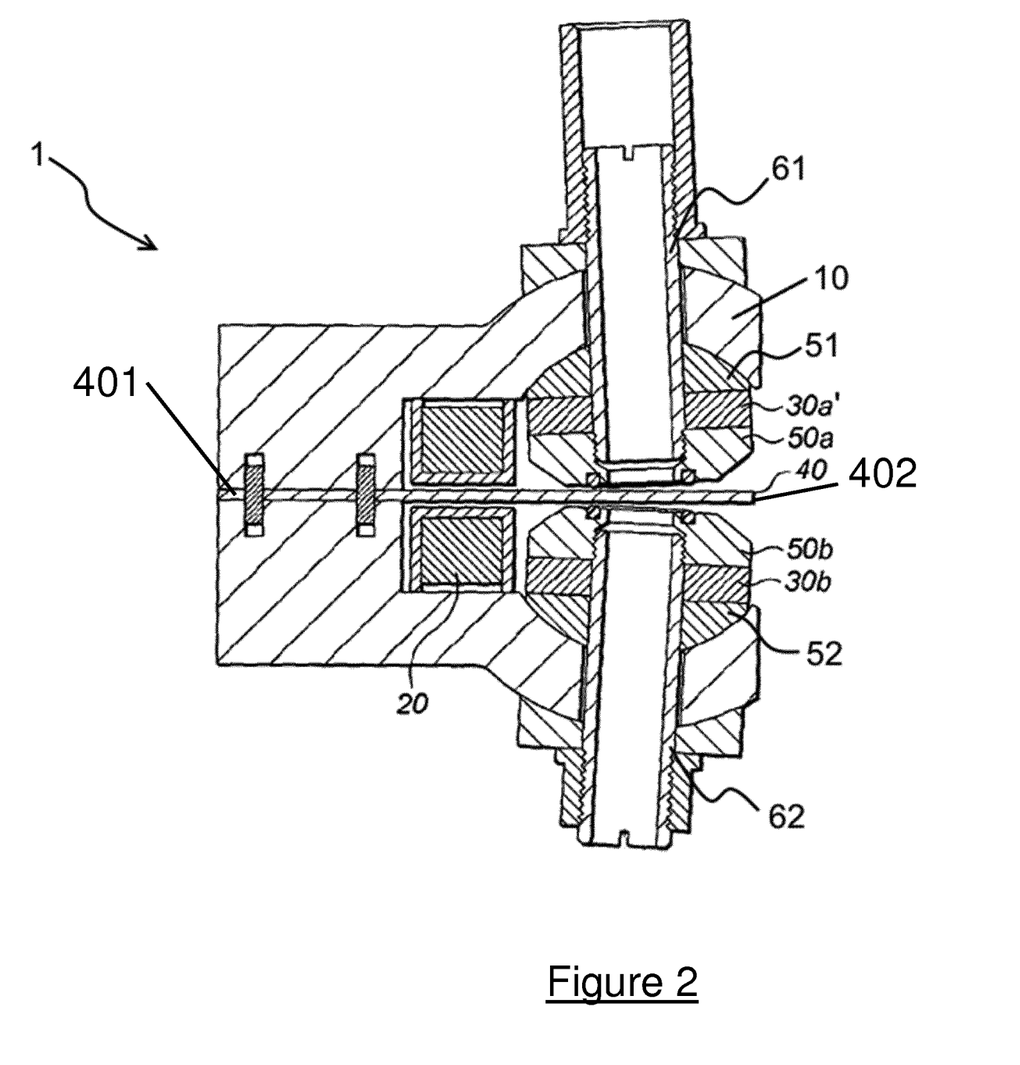
FIG. 2 shows a valve according to some embodiments.

With reference, therefore, to FIG. 1 of the present application, EP2756215 teaches an electromagnetic valve comprising a yoke 10. A magnet 30a, 30b is provided having pole pieces 50a, 50b defining a gap 60. A flexure assembly 40 has one end attached to the yoke 10, such that part of the flexure assembly extends into the gap. The flexure assembly 40 has at least one resilient portion formed of a resilient material and at least one magnetisable portion, wherein the part of the flexure assembly 40 that extends into the gap is movable between the pole pieces through an intermediate position towards which it is resiliently biased such that a resilient mechanical force is generated by deflecting the resilient portion from an undeflected position. A means 20 is provided for polarising the magnetisable portion of the flexure assembly 40 so that the part of the flexure assembly 40 that is movable between the pole pieces is attracted towards a pole piece by a magnetic force, thereby defining a valve state. The magnetisable portion and the resilient portion of the flexure assembly are configured such that the magnetic force defining the valve state is greater than the resilient mechanical force.

EP2756215 teaches several different forms of flexure assembly.

EP2756215 also specifically teaches that such valves can be used in vehicle braking systems—in which fast switching times are required with large pressure differentials across the valve.

If there is no electrical power provided to the coil of the valve of EP2756215, then the state of the valve can be unpredictable or, at least, dependent on the state of the valve immediately prior to termination of the supply of electrical power. In particular, the flexure assembly 40 may be retained in a position such that it abuts a particular pole piece 50a,50b (e.g. if the flexure assembly 40 was abutting that pole piece 50a,50b when electrical power was lost) or may return to the intermediate position (e.g. if the flexure assembly 40 had not reached a position close enough to a pole piece 50a,50b to ensure that the elastic flexure force of the flexure assembly 40 could be overcome by the magnetic force and air pressure force)—see FIGS. 2A-2D of EP2756215, for example).

Therefore, the valve of EP2756215 has no failsafe state. This can pose problems when used in brake systems in which safe operation of valves often dictates that there is a failsafe state. As a result, the valve of EP2756215 may not be suitable for certain applications and/or may require additional components to be provided in the braking system in order to provide a failsafe operation for a part of the brake system including the valve.

There is a need, therefore, alleviate one or more problems associated with the prior art.

Accordingly, an aspect provides an electromagnetic flexure valve including: a first pole piece and a second pole piece; a flexure assembly a portion of which is configured for movement between a first state adjacent the first pole piece and a second state adjacent the second pole piece; a coil configured to receive electrical power from a power supply and to actuate the flexure assembly between the first and second states; and a biasing configuration configured to bias the flexure assembly into the first or the second state when the coil is not powered and irrespective of the current state of the flexure assembly such that a failsafe mode is provided.

The biasing configuration may include a predetermined bend or curve along a length of the flexure assembly.

The predetermined bend or curve along a length of the flexure assembly may be towards a proximal end of the flexure assembly relative to the first and second pole pieces.

The predetermined bend or curve along a length of the flexure assembly may be adjacent the first and second pole pieces.

The flexure assembly may include a plurality of layers.

The at least one layer of the plurality of layers may be a pre-stressed layer.

The biasing configuration may include an electromagnet and second magnet configured such that the electromagnet and second magnet apply a substantially balanced magnetic force on the flexure assembly when electrical power is provided to the electromagnet and when electrical power ceases to be provided to the electromagnet the magnetic force of the second magnet moves the flexure assembly towards the second magnet or retains the flexure assembly in a position biased towards the second magnet.

The biasing configuration may include: a first magnet and a second magnet, the first and second magnets being imbalanced such that the flexure assembly is biased towards one of the first and second magnets; and a circuit configured to apply an electrical biasing current to the coil in order to overcome the biasing of the flexure assembly by the first or second magnet.

The biasing configuration may include a failsafe circuit configured to provide electrical power to the coil to bias the flexure assembly towards the first or second pole piece in the event of a detected failure of a power supply.

Another aspect provides a flexure assembly for use with an electromagnetic flexure valve, the flexure assembly having a predetermined bend or curve.

Embodiments of the invention are described, by way of example only, with reference to the accompanying drawings, in which.

Embodiments may include a valve 1—see FIGS. 2, 4-6, and 10. The valve 1 is an electromagnetic flexure valve 1.

The valve 1 includes a flexure assembly 40 may be held within a yoke 10 at a proximal end 401 of the flexure assembly 40. The proximal end 401 of the flexure assembly 40 may be secured a main portion of the yoke 10, from which two adjacent arm portions may extend. A distal end 402 of the flexure assembly 40 may extend to be located between the two adjacent arm portions of the yoke 10.

A first of the two adjacent arm portions of the yoke 10 may carry a first tubular member 61 (which may be formed of a non-magnetic material). An end of the first tubular member 61 may be located in the region of the distal end 402 of the flexure assembly 40. The first of the two adjacent arm portions of the yoke 10 may further carry a first pole piece 50*a* which may be formed from bright mild steel, for example. The first pole piece 50*a* may include a portion which is located between the end of the first tubular member 61 and the distal end 402 of the flexure assembly 40. The first pole piece 50*a* may define an aperture therethrough which leads to a passage defined by the first tubular member 61.

The first pole piece 50*a* may include a seal member 80 (such as a rubber O-ring) adjacent the aperture and around the aperture, at a face of the first pole piece 50*a* closest to the flexure assembly 40.

The first of the two adjacent arm portions of the yoke 10 may carry a first magnet 30*a* (which may be a permanent magnet) which may be a strong magnet such as a Neodymium-iron-boron (NdFeB) magnet. The first magnet 30*a* may be located adjacent the first pole piece 50*a* and may be located between the first pole piece 50*a* and the first of the two adjacent arm portions of the yoke 10.

In some embodiments, the first of the two adjacent arm portions of the yoke 10 includes a first packer 51. The first packer 51 may be located between, for example, the first magnet 30*a* and the first of the two adjacent arm portions of the yoke 10. A first surface of the first packer 51 may correspond with an adjacent surface of the first magnet 30*a* and a second surface (opposing the first surface across a depth of the first packer 51) may correspond to a curved surface of the first of the two adjacent arm portions of the yoke 10. The first packer 51 may, therefore, allow an angle between a longitudinal axis of the first tubular member 61 and the first of the two adjacent arm portions of the yoke 10 to be adjusted (e.g. to ensure a good seal between the flexure assembly 40 and the first pole piece 50*a* in use).

The first pole piece 50*a*, first magnet 30*a*, and first packer 51 (if provided) may be generally annular in form such that they may fit around a portion of a length of the first tubular member 61.

The arrangement may be replicated for the second of the two adjacent arm portions of the yoke 10, with the same (but opposing) arrangement of a second pole piece 50*b* (which may include a seal 80), a second tubular member 62, a second magnet 30*b*, and a second packer 52. The description in relation to the elements carried by the first of the two adjacent arm portions of the yoke 10 should, therefore, be considered as equally applicable to the second of the two adjacent arm portions of the yoke 10.

In some embodiments, the proximal end 401 of the flexure assembly 40 is clamped by the yoke 10 and may be clamped between the first and second arm portions thereof, with the distal end 402 extending therefrom in a cantilevered manner.

The yoke 10 may be further configured to house a coil 20 between the first and second adjacent arm portions of the yoke 10 towards the proximal end 401 of the flexure assembly 40 (relative to the position of the first and second pole pieces 50*a*,50*b* along the flexure assembly 40). The coil 20 may extend around the flexure assembly 40.

The flexure assembly 40 could take any of the general forms disclosed in EP2756215, for example. Indeed, the valve 1 could be a valve 1 generally in accordance with the teachings of EP2756215.

The operation of the valve will be understood from the teachings of EP2756215, for example. In particular, the flexure assembly 40 may be actuated by passing electric power (i.e. a current) through the coil 20 to attract the flexure assembly 40 to a particular one of the pole pieces 50*a*,50*b*. Abutment of the flexure assembly 40 with the first pole piece 50*a* may be considered to be (a first flexure assembly state and) a first valve state and abutment of the flexure assembly 40 with the second pole piece 50*b* may be considered to be (a second flexure assembly state and) a second valve state.

In accordance with embodiments, however, unlike the valves of EP2756215, a failsafe mode may be provided. In accordance with this failsafe mode, the flexure assembly 40—even in the absence of electric power provided to the coil 20 may be configured to adopt a predetermined state (i.e. a single one of the first and second states). Therefore, in some embodiments, the valve 1 may be a monostable valve 1 (the valve of EP2756215 may be viewed as a bistable valve, for example).

Accordingly, in the failsafe mode, the predetermined state may be the first or the second valve state (as described above) depending on the desired operation (and so design) of the valve 1.

The failsafe mode may be achieved in a number of different manners (e.g. using a biasing configuration).

In some embodiments (such as that depicted in FIG. 2) one of the first and the second magnets 30*a*,30*b* is not a permanent magnet as described above but is an electromagnet. In such embodiments, the other of the first and second magnets 30*a*,30*b* would remain a permanent magnet. Whilst the electromagnet could be the first or the second magnet 30*a*,30*b*, these embodiments will be described with the first magnet 30*a* being the electromagnet 30*a*' (again, see FIG. 2, for example) for the sake of simplicity and it will be appreciated that this description will apply equally if the second magnet 30*b* were the electromagnet.

In some such embodiments, therefore, the first magnet 30*a* is an electromagnet (so herein the first electromagnet 30*a*'). The first electromagnet 30*a*' may be configured to receive electrical power from a power supply 100—see FIG. 3, for example. The power supply 100 may include a power controller 101 which is configured to regulate the electrical power provided to the first electromagnet 30*a*. The power controller 101 may control the electrical power supplied to the first electromagnet 30*a* such that the magnetic flux of the first electromagnet is substantially equal in magnitude (but opposite in direction) to the magnetic flux of the second magnet 30*b*. In other words, the control may be such that a magnetic force applied to the flexure assembly 40 is substantially balanced (i.e. equal and opposite from the second magnet 30*b* and the first electromagnet 30*a*'). The power controller 101 may be configured to, for example, provide pulse width modulated electric current to the first electromagnet 30*a* (or some other pulsed current arrangement).

Figure 3:
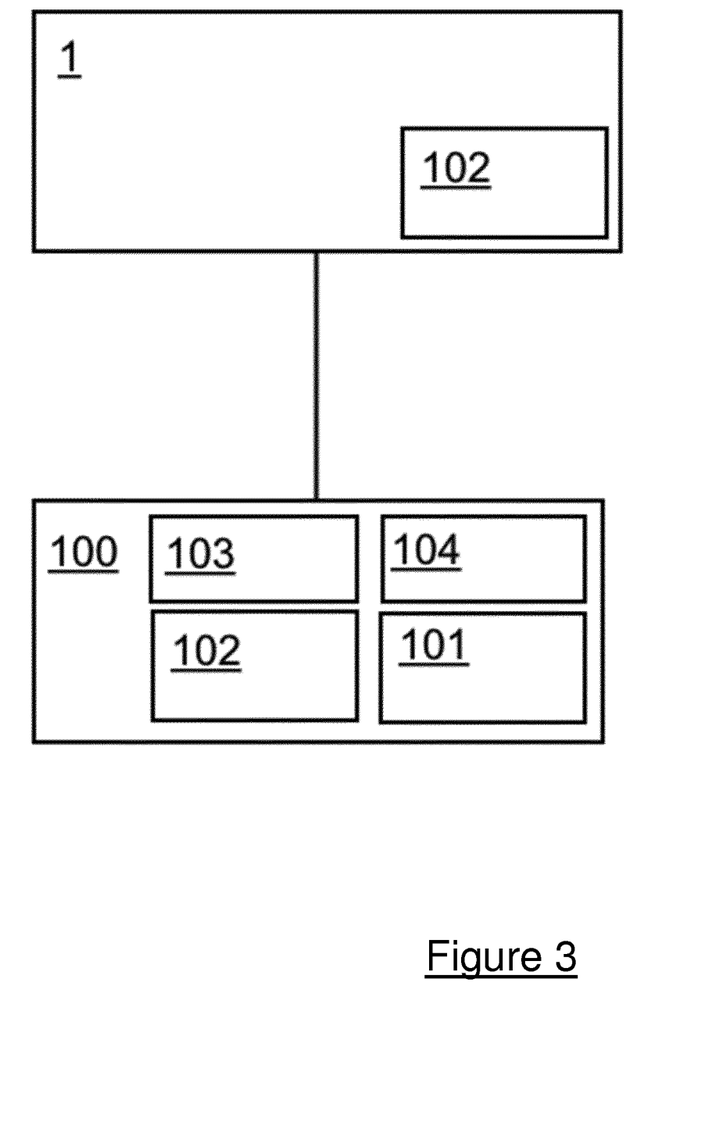
FIG. 3 show a schematic view of a valve and power supply according to some embodiments.
Figure 4:
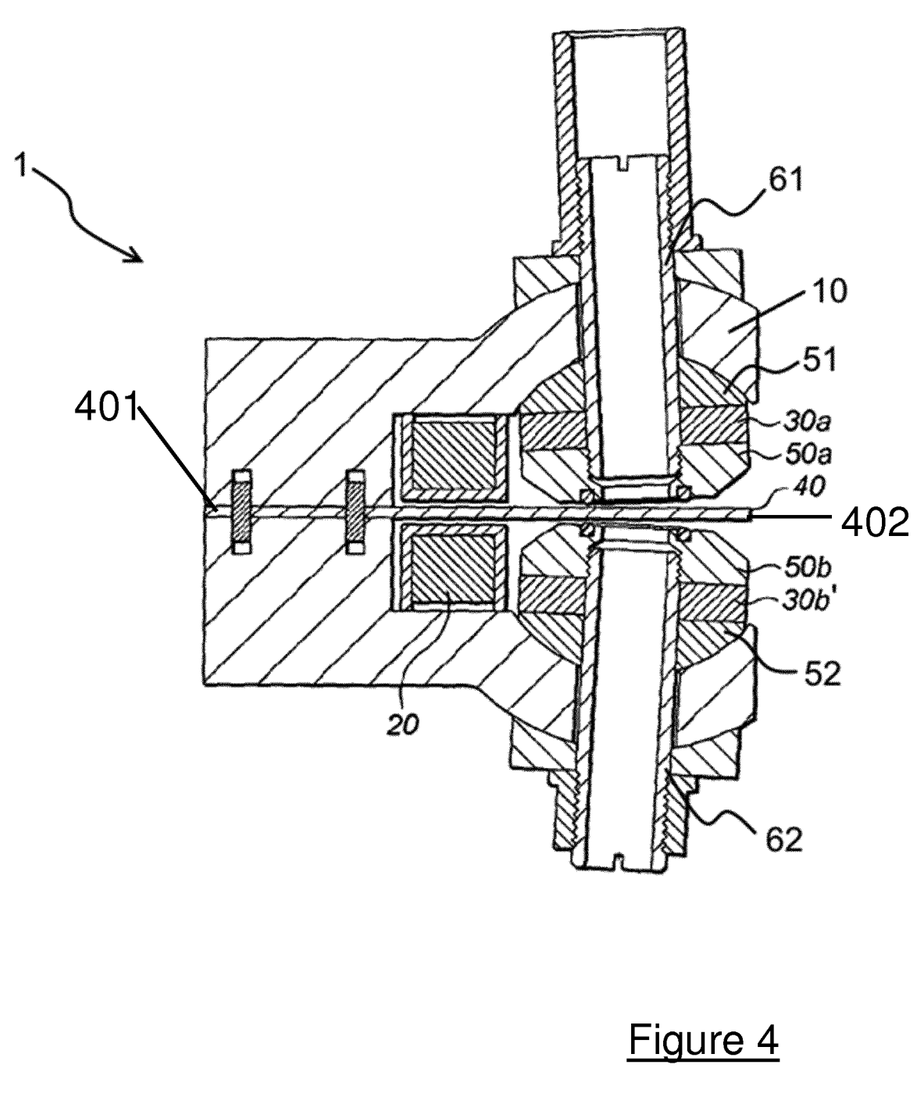
FIG. 4 shows a valve according to some embodiments.
Figure 5:
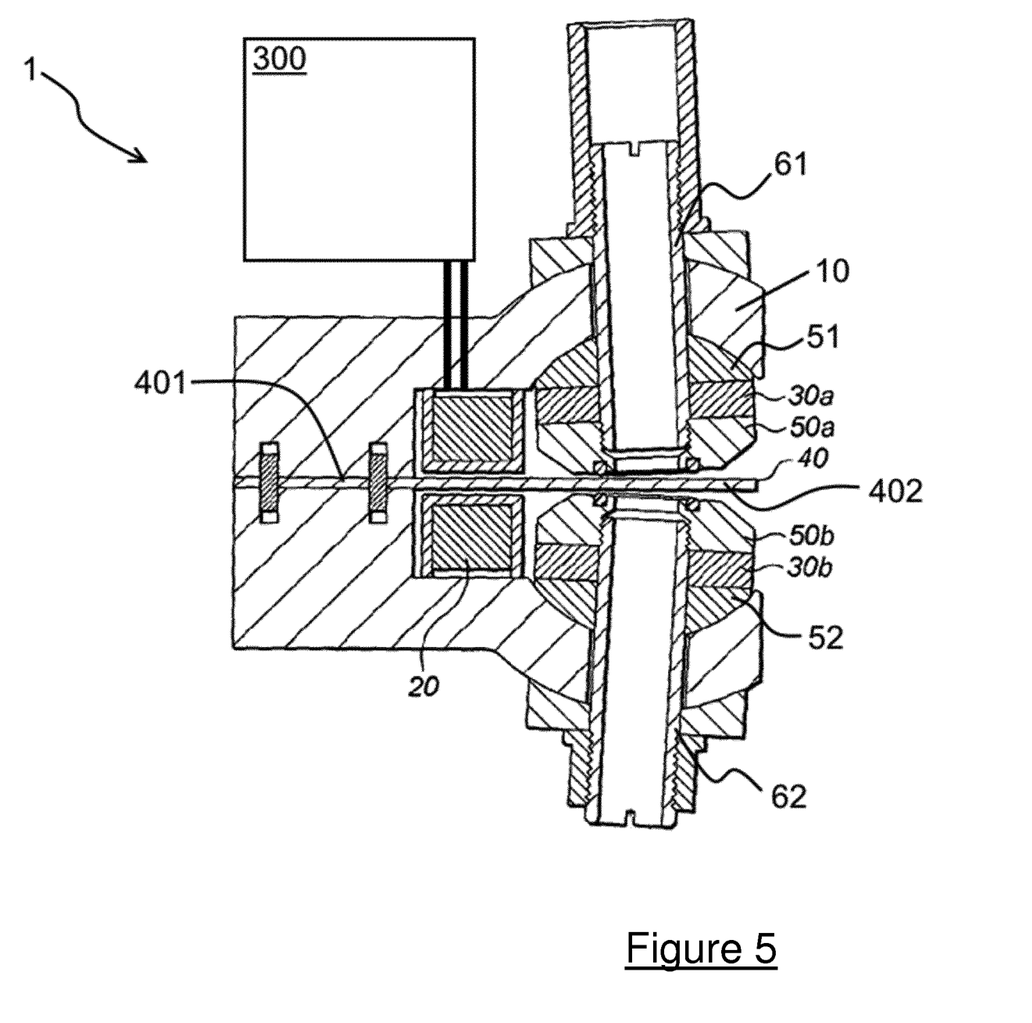
FIG. 5 shows a valve according to some embodiments.
Figure 6:
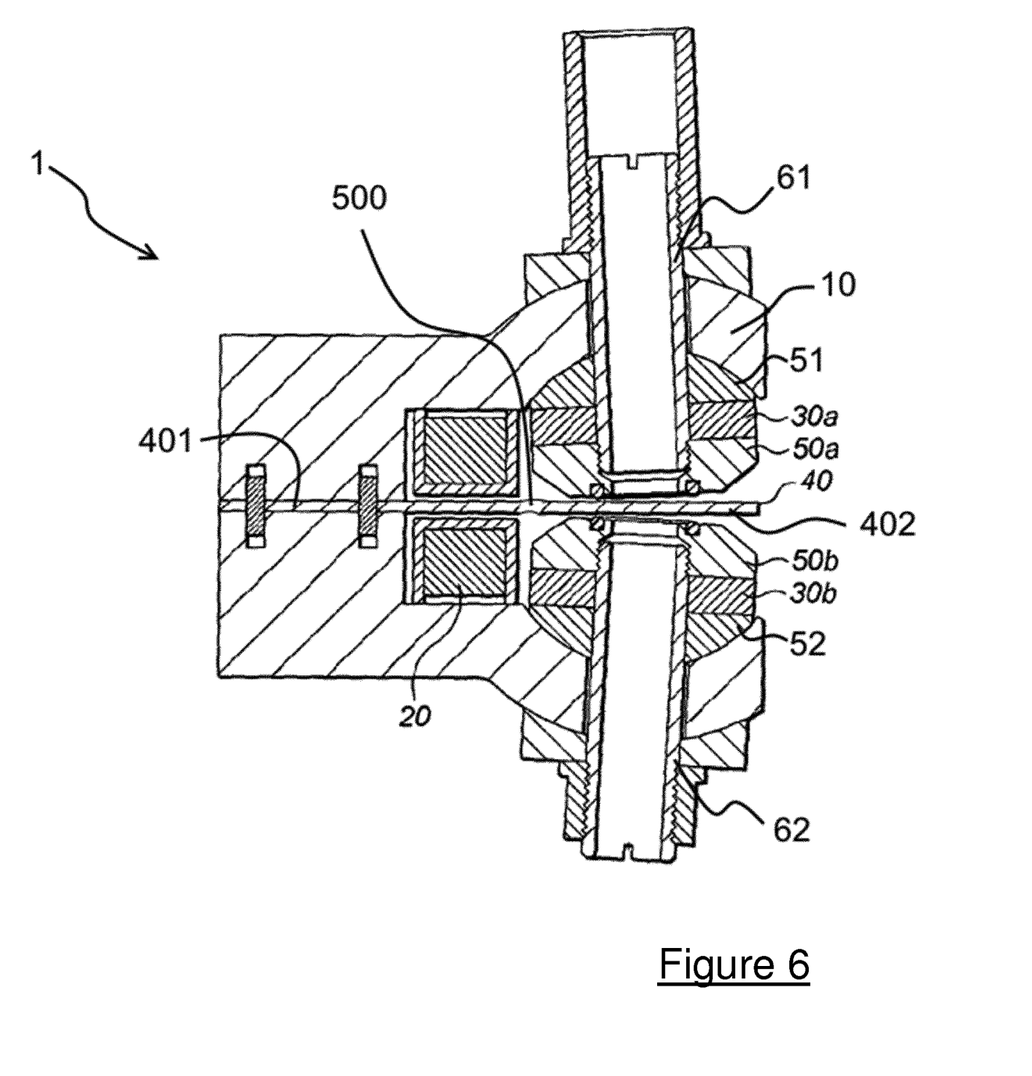
FIG. 6 shows a valve according to some embodiments.
Figure 7:
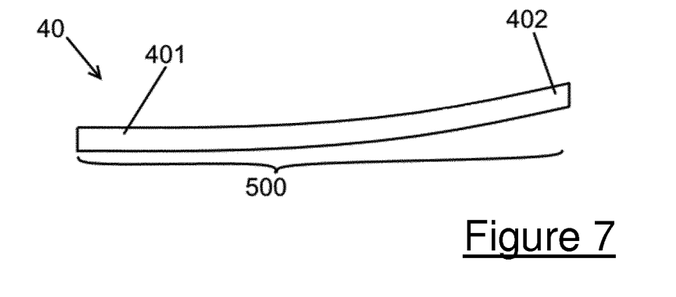
FIG. 7-9 show flexure assemblies of some embodiments.
Figure 8:
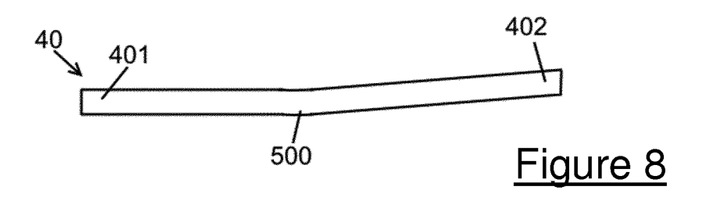

The power controller 101 may be communicatively coupled to one or more sensors 102 (such as Hall Effect sensors) to in order to control the electrical power delivered to the first electromagnet 30*a*' to seek to match the magnitude of the flux of the first electromagnet 30*a*' and the second magnet 30*b*. The one or more sensors 102 may be provided as part of the power supply 100 or as part of the valve 1.

The power supply 100 may include one or more batteries 103 and/or one or more electrical generators 104 (e.g. an alternator) which may form part of a vehicle and/or vehicle trailer. The vehicle may be a vehicle with one or more ground engaging wheels for example (such as a truck). The power controller 101 may be configured to control (e.g. regulate) the electrical power provided by the one or more batteries 103 and/or electrical generators 104 in order to provide the required electrical power to the first electromagnet 30a'. The power supply 100 may also provide (through another controller) electrical power to the coil 20 which actuates the valve 1 between the first and second states—as such the coil 20 may be connected in electrical communication with the one or more batteries 103 and/or the one or more electrical generators 104.

During normal operation of the valve 1, therefore, the first electromagnet 30a may be powered by the power supply 100. The valve 1 can then operate in the manner generally described in EP2756215.

If electrical power to the first electromagnet 30a is lost (i.e. not provided), then the magnetic attractive force on the flexure assembly 40 in the direction of the second pole piece 50b will be higher than that in the direction of the first pole piece 50a. Therefore, the first flexure assembly 40 will move towards or be retained in the second state. The second state is, therefore, in this configuration the failsafe mode. The opposite failsafe mode (i.e. the first state) could be achieved in the same manner but with the second magnet 30b as the electromagnet (and so being a second electromagnet 30b'—see FIG. 4, for example).

In some such embodiments, the electromagnet 30a',30b' may be provided as a coil through which the power supply 100 is configured to provide electrical current.

In some embodiments, the electromagnet 30a',30b' may be integrally formed with the first or second packer 51,52 as the case may be.

In some embodiments, both first and second magnets 30a,30b are provided as permanent magnets but one is weaker (i.e. provides less magnetic flux) than the other. The weaker of the first and second magnets 30a,30b may be supplemented by an electromagnet (which might, therefore, be referred to as a first or second supplemental electromagnet, as the case may be)—to balance, during normal operation, the magnetic forces on the flexure assembly 40 when in the intermediate state (i.e. between the first and second states and without activation of the coil 20).

In some embodiments, the electromagnet may be provided as part of the first or second pole piece 50a,50b.

In some embodiments, the electromagnet may be provided in series with the first or second adjacent arm portions of the yoke 10 (and could form part of the yoke 10, for example).

In some embodiments, the electromagnet may not be provided; however, the magnets 30a,30b may be mismatched such that one of the first and second magnets 30a,30b imparts a stronger magnetic attractive force on the flexure assembly 40 than the other when in the intermediate state (i.e. between the first and second states and without activation of the coil 20). This imbalance means that the flexure assembly 40 is biased towards either the first or the second pole piece 50a,50b (i.e. the pole piece 50a,50b associated with the one of the first and second magnets 30a,30b which imparts the stronger magnetic attractive force on the flexure assembly 40 than the other. During normal use, this imbalance may be counterbalanced by the provision of an electrical biasing current through the coil 20 such that the imbalance is effectively reduced or substantially eliminated. In such embodiments, an electrical switching current may be added to the electrical biasing current to achieve switching of the valve 1 between the first and second states as described herein elsewhere. To achieve this, the valve 1 may include an electrical biasing circuit 300—see FIG. 5.

Accordingly, in some embodiments, the flexure assembly 40 is biased into a failsafe mode by the use of the electromagnet or coil 20 such that there is an imbalance in the magnetic forces applied to the flexure assembly 40 in favour of the failsafe mode if electrical power to the electromagnet is discontinued (even if there is no electrical power provided to the coil 20) or if there is no electrical power provided to the coil 20 (and there is no electromagnet).

In some embodiments, the flexure assembly 40 may be mechanically formed to favour the failsafe mode (which, again, could be the first or the second state).

This may be achieved by the provision of a predetermined bend or curve 500 to a part of the flexure assembly 40—see FIGS. 6-9. The predetermined bend may be configured to cause the distal end 402 of the flexure assembly 40 to favour the failsafe mode. In some embodiments, the predetermined bend or curve 500 is located towards the proximal end 402 (relative to the location of the first and second pole pieces 50a,50b). In some embodiments, the predetermined bend or curve 500 is located away from portions of the flexure assembly 40 which are configured to contact the pole pieces 50a,50b to form a seal therewith (e.g. with the seal members 80)—to reduce the impact of the predetermined bend or curve 500 on the seal with the pole pieces 50a,50b.

In some embodiments, the predetermined bend or curve 500 may include a curve 500 (see FIGS. 7 and 9, for example) along a length of the flexure assembly 40 which is configured to contact the pole pieces 50a,50b to provide the seals therewith. In some such embodiments, however, the first and second pole pieces 50a,50b may be correspondingly shaped and/or a deformable seal 80 may be provided which is configured to conform to the curve 500. In some embodiments, this may mean that the first and second pole piece 50a,50b are each configured to contact a respective one of a convex or a concave flexure assembly 40. In some embodiments, the predetermined curve of the flexure assembly 40 between the pole pieces 50a,50b may change as the flexure assembly 40 moves between the first and second states—e.g. with the surface thereof adjacent the first pole piece 50a changing from a convex towards a concave surface (or vice versa) as the flexure assembly 40 moves towards the second pole piece 50b.

Figure 9:
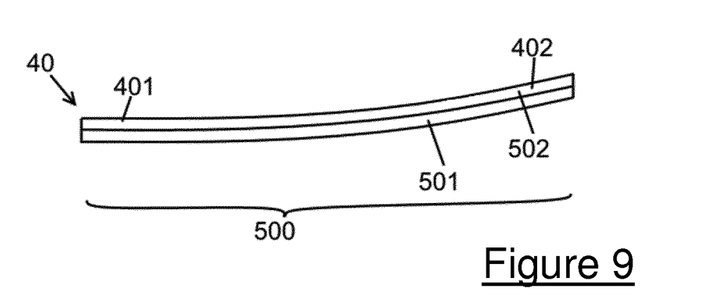
Figure 10:
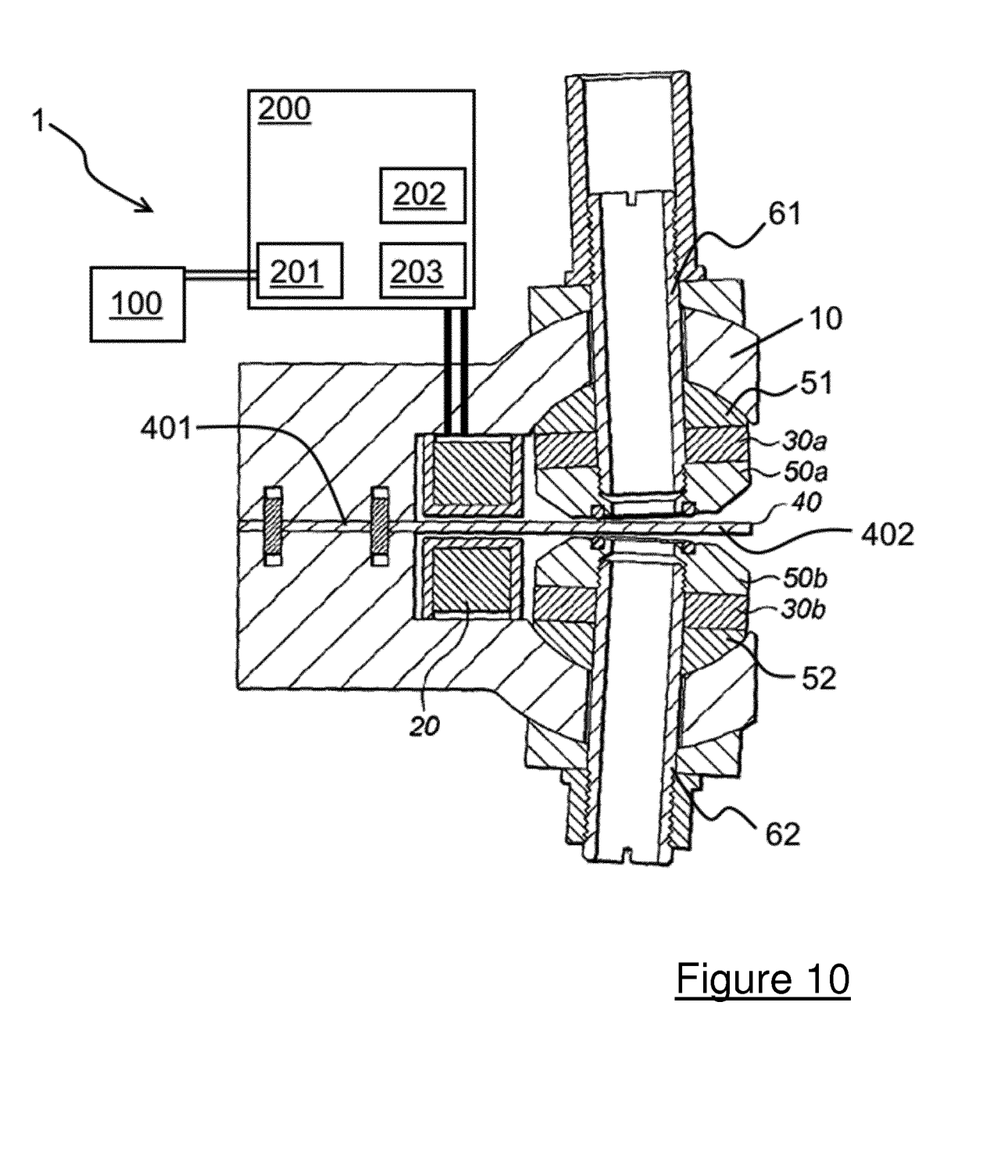
FIG. 10 shows a valve according to some embodiments.

The flexure assembly 40 could include a laminated section in which multiple layers 501,502 of material are provided to form the flexure assembly 40—see FIG. 9 as an example. Such arrangements may be generally in the form of the "fingers" of EP2756215, for example. In some embodiments, the layers 501,502 of material may be secured to each other at discrete positions along their length or substantially continuously along their length. The layers 501,502 of material may have different properties so as to provide a bias of the flexure assembly 40 towards the first or second state. In some embodiments, one of the layers 501,502 is stressed when secured to another of the layers 501,502 so as to provide the predetermined bend in the flexure assembly 40 or otherwise provide the bias towards the first or second positions. This may generally be referred to, for example, as a pre-stressed layer 501,502.

In some embodiments, the failsafe mode of operation may be achieved through electrical control of the operation of the coil 20. In such embodiments, the valve 1 may have magnets 30a,30b which are balanced (i.e. such that the flexure member 40 is not biased towards either of the pole pieces 50a,50b in the absence of electrical power and with the flexure member 40 in its intermediate position). However, the coil 20 may be coupled in electrical communication with a failsafe circuit 200. The failsafe circuit 200 may include a power detection circuit 201 which is configured to detect a loss of the electrical power supply (e.g. from the power supply 100 which may power the coil 20 in normal operation). The failsafe circuit 200 may further include a power storage system 202 which is configured to provide electrical power to the coil 20. The power storage system 202 may be substantially independent of the power supply 100 such that a loss of power from the power supply 100 does not result in loss of electrical power from the power storage system 202 other than by discharge to the coil 20—as described below.

The power detection circuit 201 may be further configured, on detection of a loss of electrical power, to trigger the discharge of the power storage system 202 to the coil 20. This discharge may cause, for example, the flexure assembly 40 to be moved to, or retained in, a one of the first and second states (as required), in generally the same manner as the coil 20 is used to switch the state of the flexure assembly 40 during normal operation. In other words, the discharge through the coil 20 may provide a magnetic flux which forces the flexure assembly 40 to adopt one of the first and second states (predetermined by direction of discharge through the coil 20).

The power storage system 202 may be a temporary power storage system 202 which is configured to charge using electrical power from, for example, the power supply 100. This charging may be substantially continuous. The power storage system 202 could, therefore, include a battery and/or a capacitor, for example. The power storage system 202 may be configured such that the discharge of electrical power to the coil 20 is sufficient, when triggered, to switch the flexure assembly 40 from the first to the second state (or vice versa). A switch device 203 (of the failsafe circuit 200) may be provided in electrical communication between the power storage system 202 and the coil 20, the switch device 203 may be configured to control the electrical communication between the power storage system 202 and the coil 20, and so may be communicatively couple to the power detection circuit 201 (which is configured to cause actuation of the switch device 203). The switch device 203 may be configured, on actuation, to provide electrical power to the coil 20 in a series of pulses, for example (such as in a pulse width modulated manner).

In some embodiments, all of the components of the failsafe circuit 200 may be configured to be powered by the power storage system 202 of the failsafe circuit 200 if the supply of electrical power from the power supply 100 ceases. In embodiments all of the components of the failsafe circuit 200 are configured to be powered by the power storage system 202 of the failsafe circuit 200, sufficiently to achieve the failsafe mode (i.e. in a worst case scenario to switch state of the flexure assembly 40 if it is not already in the failsafe mode), if the supply of electrical power from the power supply 100 ceases. Accordingly, the failsafe circuit 200 may provide an electrical failsafe operation for the valve 1. The failsafe circuit 200 may form part of the valve 1.

As will be appreciated, therefore, in some embodiments, the flexure assembly 40 is biased towards a failsafe mode. This enables some embodiments to be more readily used in certain safety critical valves 1 of, for example, a vehicle brake system, than some previous valves. In addition, the failsafe mode of operation being integral to the operation of the valve 1 may enable one or more other components to be omitted from a brake system—components which might otherwise provide a failsafe mode, for example.

Whatever mechanism is provided in accordance with embodiments to achieve the biasing of the flexure assembly 40, that mechanism is a biasing configuration. The biasing configuration may, therefore, may include a predetermined bend in the flexure assembly 40 and/or the provision of an electromagnet and/or the provision of a failsafe circuit 200. It will be appreciated that multiple such biasing configurations may be provided (e.g. to provide backup failsafe configurations should one fail).

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An electromagnetic flexure valve configured to provide a failsafe mode for monostable operation, the electromagnetic flexure valve comprising:
   a first pole piece and a second pole piece;
   a flexure assembly a portion of which is configured for movement between a first state adjacent the first pole piece and a second state adjacent the second pole piece;
   a coil configured to receive electrical power from a power supply and to actuate the flexure assembly between the first and second states;
   an electromagnet configured to apply to the flexure assembly an electromagnetic force in response to the electrical power from the power supply;
   a permanent magnet configured to apply to the flexure assembly a persistent magnetic force irrespective of the electrical power from the power supply; and
   wherein the electromagnetic force and the persistent magnetic force are configured to be substantially balanced on the flexure assembly when the electrical power is provided, and in response to absence of the electrical power, the flexure assembly is configured for biasing into a predetermined state, either the first or the second state, irrespective of a current state of the flexure assembly, wherein the persistent magnetic force is configured for applying the biasing into the predetermined state with the flexure assembly located towards the permanent magnet such that the failsafe mode is provided.

2. An electromagnetic flexure valve according to claim 1, wherein the flexure assembly includes along its length a predetermined bend or curve.

3. An electromagnetic flexure valve according to claim 2, wherein the predetermined bend or curve is located towards a proximal end of the flexure assembly relative to the first and second pole pieces.

4. An electromagnetic flexure valve according to claim 2, wherein the predetermined bend or curve is adjacent the first and second pole pieces.

5. An electromagnetic flexure valve according to claim 2, wherein the flexure assembly includes a plurality of layers that act to establish the predetermined bend or curve.

6. An electromagnetic flexure valve according to claim 5, wherein the at least one layer of the plurality of layers is a pre-stressed layer.

7. An electromagnetic flexure valve according to claim 1, further comprising a failsafe circuit configured to provide biasing electrical power to the coil to bias the flexure assembly towards the first or second pole piece in the event of a detected failure of the power supply.

8. An electromagnetic flexure valve according to claim 1, wherein the electrical power supplied to the electromagnet is controlled such that magnetic flux of the electromagnet is substantially equal in magnitude and opposite in direction compared to that of the permanent magnet.

9. An electromagnetic flexure valve according to claim 1, wherein the electromagnet receives the electrical power as pulsed current controlled by a power controller in the power supply.

10. An electromagnetic flexure valve according to claim 9, wherein the pulsed current is pulse width modulated electric current.

11. An electromagnetic flexure valve according to claim 9, further comprising one or more sensors for indicating the magnetic force to the power controller.

12. An electromagnetic flexure valve according to claim 1, further comprising one or more sensors for controlling the electrical power delivered to the electromagnet.

13. An electromagnetic flexure valve according to claim 12, wherein at least one of the one or more sensors is a Hall Effect sensor.

14. An electromagnetic flexure valve according to claim 1, wherein the electromagnet is a supplemental electromagnet.

15. An electromagnetic flexure valve according to claim 1, wherein the electromagnet may be provided as part of the first or second pole piece.

16. An electromagnetic flexure valve according to claim 1, wherein the permanent magnet may be provided as part of the first or second pole piece.

17. An electromagnetic flexure valve according to claim 1, further comprising a yoke having first and second arm portions.

18. An electromagnetic flexure valve according to claim 17, wherein the electromagnet is provided in series with the first or second adjacent arm portions of the yoke.

19. An electromagnetic flexure valve according to claim 17, wherein the permanent magnet is provided in series with the first or second adjacent arm portions of the yoke.

20. An electromagnetic flexure valve according to claim 1, wherein the permanent magnet is a Neodymium-iron-boron magnet.

* * * * *